United States Patent [19]

Stevens

[11] 4,140,973
[45] Feb. 20, 1979

[54] CHANNEL EVALUATION APPARATUS FOR POINT-TO-POINT COMMUNICATIONS SYSTEMS

[75] Inventor: Everett E. Stevens, Manotick, Canada

[73] Assignee: Canadian Patents and Development Limited, Ottawa, Canada

[21] Appl. No.: 782,424

[22] Filed: Mar. 29, 1977

[51] Int. Cl.² ............................................. H04B 17/00
[52] U.S. Cl. ................................... 325/67; 343/176; 325/51; 325/65
[58] Field of Search ............................ 325/31, 51–54, 325/56–58, 65, 67; 343/176, 179, 200, 178, 177

[56] References Cited

U.S. PATENT DOCUMENTS

| | | | |
|---|---|---|---|
| 3,160,813 | 12/1964 | Biggi et al. | 325/56 |
| 3,475,684 | 10/1969 | Covill | 325/56 |
| 3,475,685 | 10/1969 | Covill | 325/67 |
| 3,487,312 | 12/1969 | Egan et al. | 325/56 |
| 3,495,176 | 2/1970 | Egan | 325/65 |
| 3,532,988 | 10/1970 | Magnuski | 325/56 |
| 3,543,161 | 11/1970 | Hatton et al. | 325/65 |
| 3,827,052 | 7/1974 | Tanaka | 343/179 |

Primary Examiner—Robert L. Griffin
Assistant Examiner—Jin F. Ng
Attorney, Agent, or Firm—Edward Rymek

[57] ABSTRACT

A point-to-point high frequency communications system has a first set of frequency channels for transmission between a first terminal and a second terminal, and a second set of frequency channels for transmission between the second terminal and the first terminal. The channel evaluation apparatus includes a sounding transmitter and receiver at each terminal. These equipments operate in parallel with the regular communications system and provide the facility for real-time evaluation of all assigned channels using a sampling technique. Each sounding transmitter periodically transmits sounding signals in time-step sequence through its respective frequency channels to the sounding receiver at the other terminal. The sounding signals for each channel are evaluated for transmission quality and this information is displayed. The operator at each terminal may manually or automatically determine the desired channel of reception and this information which is then encoded on the sounding signals transmitted to the other terminal, is used by the operator at the other terminal to set the communication channel.

5 Claims, 2 Drawing Figures

CHANNEL EVALUATION APPARATUS FOR POINT-TO-POINT COMMUNICATIONS SYSTEMS

BACKGROUND OF THE INVENTION

This invention is directed to a communications channels evaluation system and in particular to an evaluation system for point-to-point high frequency communication systems.

Uncertainty exists in realizing the overall potential of high frequency communications systems. Equipment parameters can be controlled by the operating personnel but factors such as propagation conditions over the transmission path, the presence of co-channel interference on a particular channel and the ability to select the optimum traffic frequency at any given time are normally beyond their control. Yet these factors are vital in maintaining circuit reliability at its fullest potential.

The operational approach to high frequency communications has conventionally been to assign a family of frequencies to a particular circuit which are used at the discretion of the operating personnel, the traffic frequency at any given time being selected either on the basis of long term frequency predictions or operational experience. As high frequency propagation is subject to the vagaries of the ionospheric characteristics present at any given time over the propagation path, there is no guarantee that the optimum channel is being used or that communications can be successful using these conventional methods for circuit control. Furthermore there is no means for the operating staff to assess the relative performance of assigned channels without a lengthy procedure of trial and error.

For a simplex communications system wherein the same frequency is used for communication in both directions, the above problems have been obviated by channel evaluation systems such as the one described in U.S. patent Ser. No. 3,543,161 which issued on November 24, 1970 to Hatton et al. However, this system is not suitable for point-to-point high frequency communications systems wherein high traffic density is supported by simultaneous transmission in both directions on two different frequencies, each frequency being selected from a separate set of frequency assignments.

SUMMARY OF THE INVENTION

It is therefore an object of this invention to provide channel evaluation apparatus for point-to-point communications systems.

It is a further object of this invention to provide apparatus which indicates the best channel of communication in each direction for point-to-point communications system.

These and other objects are achieved in a channel evaluation apparatus for a point-to-point high frequency communications system which has a first set of communication frequency channels for transmission between a first terminal and a second terminal and a second set of communication frequency channels for transmission between the second terminal and the first terminal, and in which each of the first and second terminals has a communication transmitter and a communications receiver. The evaluation apparatus includes a first sounding transmitter located at the first terminal for transmitting first sounding signals over the first set of frequency channels to said second terminal and a second sounding transmitter located at the second terminals for transmitting second sounding signals over the second set of frequency channels to the first terminal. The evaluation apparatus further includes a first sounding receiver located at the second terminal which receives the first sounding signals transmitted over the first set of frequency channels and determines the quality of transmission over each of the frequency channels in the first set, and a second sounding receiver located at the first terminal which receives the second sounding signals transmitted over the second set of frequency channels and determines the quality of transmission over each of the frequency channels in the second set.

The sounding receivers include display devices for indicating channel quality of the respective channel sets, and the sounding transmitters include encoders for encoding channel selection information on the sounding signals which are decoded and displayed by the sounding receivers.

The apparatus may further include a first control circuit at the first terminal synchronized with a second control circuit at the second terminal. The first control circuit is coupled to the first sounding transmitter for controlling its time-step sequence through the first set of frequency channels and is further coupled to the second sounding receiver for controlling its time-step sequence through the second set of frequency channels. The second control circuit is coupled to the second sounding transmitter means for controlling its time-step sequence through the second set of frequency channels and is further coupled to the first sounding receiver for controlling its time-step sequence through the first set of frequency channels. The sounding signals may consist of a series of repeated characters, a fixed number being transmitted over each channel such that a counter in each of the first and second sounding receivers may count the number of characters received correctly on each frequency channel as a determination of channel quality.

DESCRIPTION OF THE PREFERRED EMBODIMENTS

Figure 1:
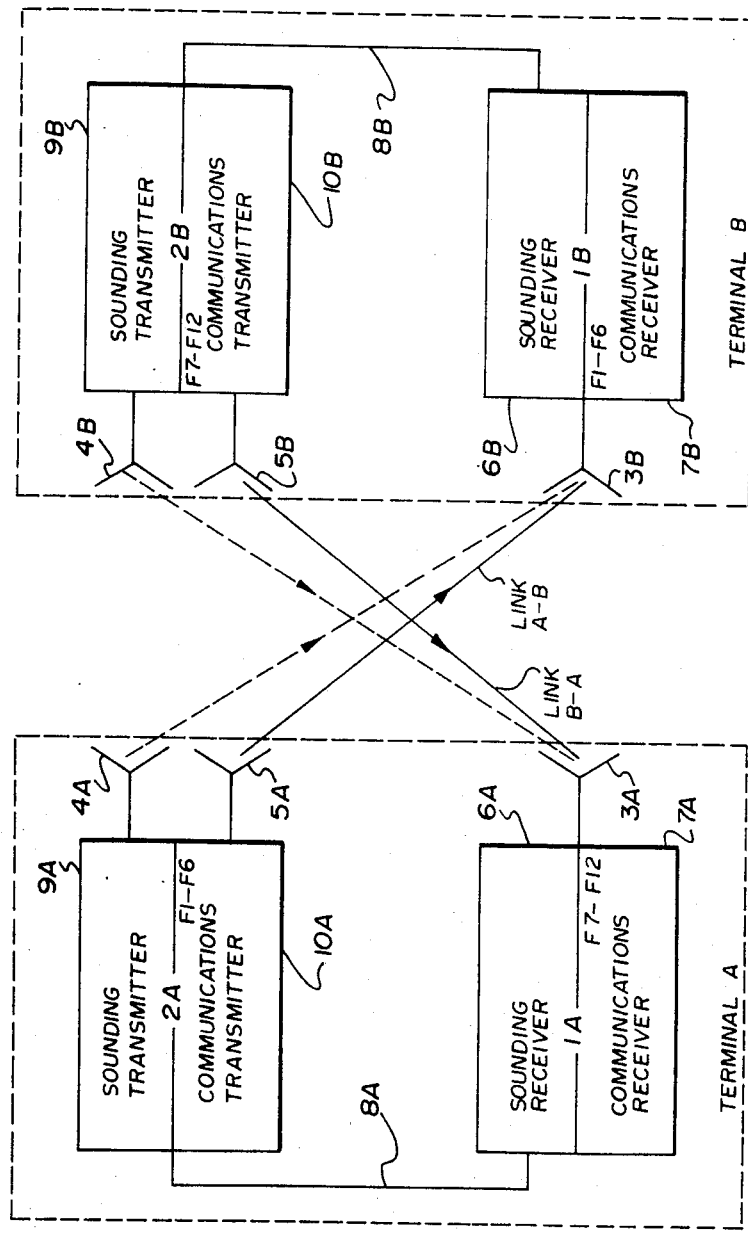
FIG. 1 schematically illustrates a point-to-point communications system with channel evaluation.

A sounding assisted point-to-point high frequency communications system having two identical terminals A and B is shown in FIG. 1. The communications system is assigned a family of frequency channels which may be any number of channels, such as 12 channels shown in this embodiment. Six frequency channels F1–F6 are assigned to transmission link A to B and the six other frequency channels transmissions F12 are assigned for transmission link B to A.

Each terminal A or B includes a central communications center 1A, 1B for receiving sounding and communications signals via an antenna 3A, 3B and a remote transmitter site 2A, 2B for transmitting sounding and communications signals via antennae 4A, 4B and 5A, 5B respectively. The transmitter site 2A, 2B is remote from the communications center 1A, 1B to avoid high level interference from local transmission which would desensitize the receiving equipment and may be located at a distance of two to twenty miles from the communications center 1A, 1B. The central communications center 1A, 1B includes sounding receiving equipment 6A, 6B and conventional communications receiving equipment 7A, 7B and, via control lines 8A, 8B, controls the transmission site 2A, 2B which includes sounding transmission equipment 9A, 9B and conventional transmission equipment 10A, 10B. These control lines 8A, 8B may be telephone lines, cable or a micro-wave link.

As illustrated in FIG. 1 the transmission equipment 2A at terminal A transmits on the F1-F6 frequency channels and the receiving equipment 1A receives on the F7-F12 frequency channel. In terminal B, the transmission equipment 2B transmits on the F7-F12 frequency channels and receiving equipment 1B receives on the F1-F6 channels.

In order to evaluate the communication channels in one link, for example link A-B, sounding signals are produced by the sounding transmitter 9A, these signals are transmitted to terminal B in time-step sequence through frequency channels F1-F6. If propagation exists, sounding receiver 6B receives the sounding signals and evaluates the received sounding signals for each channel in order to determine the best transmission channel in the A-B link. This information is used by the terminal B operator to manually or automatically set the terminal B communications receiver 7B to the proper channel and is also encoded in the sounding transmitter 9B and transmitted on the sounding signals from terminal B to terminal A. This information is usually transmitted on all of the frequencies to ensure high reliability. Sounding receiver 6A, upon reception of the encoded sounding signals, decodes the information on the sounding signals and indicates the desired channel for link A-B to the operator of terminal A. This indication is used by the operator to manually or automatically set the communication transmitter 10A to the proper channel. For the second link or link B-A, the encoded sounding signals which are transmitted from terminal B in time-step sequence through frequency channels F7-F12, are in a similar manner evaluated in the sounding receiver 6A. This information is used by the terminal A operator to manually or automatically set the terminal A communications receiver 7A to the proper channel and is also encoded in the sounding transmitter 9A as the sounding signals which are being transmitted to terminal B. In sounding receiver 6B, the sounding signals are decoded to indicate the proper channel setting for the terminal B communications transmitter 10B.

Figure 2:
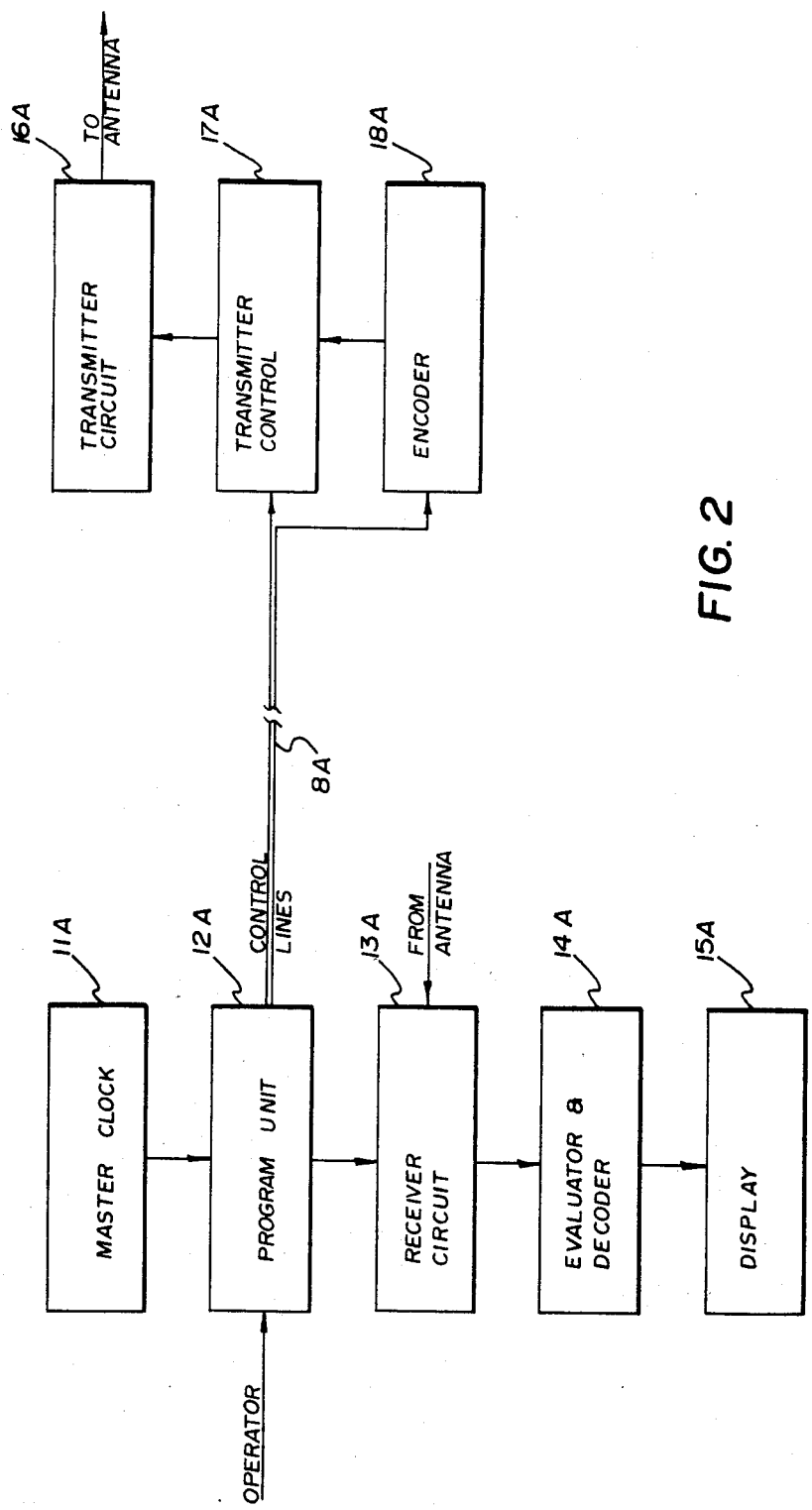
FIG. 2 illustrates channel evaluation apparatus at one terminal.

Sounding receiving apparatus 6A and sounding transmission apparatus 9A for one terminal are shown in FIG. 2. This apparatus, being the same for terminal A and B except for their different sets of frequency channels, the description will be limited to one terminal, that of terminal A. This apparatus may be operator controlled or programmed, and on the basis of channel evaluation information the communications equipment may be made to respond automatically to select and use the optimum traffic channel in each direction.

In the communications center 1A, shown in FIG. 1, sounding receiver 6A includes a master clock 11A, coupled to a program unit 12A and provides precise time for the program unit 12A. The program unit 12A in turn controls both the sounding receiver 6A and the sounding transmitter 9A, under the control of the operator, enabling each terminal A and B to be maintained in time and frequency synchronism. The program unit provides (1) the times for initiating a sounding sequence, (2) frequency control data for controlling the sounding transmitter 9A via the control line 8A, and (3) the time-step sequence for the receiver circuit 13A through channels F7-F12. The receiver circuit 13A detects the sounding transmission received from terminal B by sequentially stepping through each frequency channel F7-F12.

The receiver circuit 13A output is coupled to a signal evaluator and decoder 14A wherein the quality of the sounding signal is determined. This information is coupled to display 15A wherein channel quality is displayed to the operator. This display 15A may consist of a number of lights or a numerical indicator for each frequency channel such that the best frequency channel or channels is obvious to the operator. He can then adjust the program unit 12A to control the sounding transmitter 9A so as to encode this information on the regular sounding signals. The regular sounding signals received by receiver 13A may also be encoded to provide information as to the best frequency channel for transmission from communication transmitter 10A. These sounding signals are decoded by decoder 14A and the channel number or change is displayed on display 15A. The frequency channel for the communication transmitter 10A may then be set either automatically or by the operator.

As mentioned above, the control unit 12A controls the sounding transmitter 9A via control lines 8A. The sounding transmitter 9A includes a frequency agile transmitter circuit 16A which steps through the F1-F6 frequency channels. Control data arriving over the control lines 8A from the program unit 12A is decoded by transmitter control unit 17A which in turn provides the stepping sequence for the frequency agile transmitter circuit 16A. The transmitter circuit 16A may be modulated with a coded signal sequence provided by the sounding transmission encoder 18A to include channel information for terminal B.

Usually, it is desirable that the type of sounding signals used to evaluate channel performance bears a relationship to the mode of transmission used by the communications system. Normally this is frequency shift keyed teletype (FSK). Furthermore, the sounding signal must be of sufficient length to give a valid evaluation of a channel's performance, to allow for the effect of short fades in signal strength. In the present system, a series of characters such as a burst of 100 teletype characters, RYRYRY . . . , may be transmitted on each channel, and to evaluate the channel, the number of characters received correctly are counted.

These sequence of sounding signals through the set of frequency channels may be continuously repeated or repeated at some interval such as 5 or 10 minutes. It has been found in practice, that up-dated channel evaluation information every 10 minutes is adequate the majority of the time. However, if there is a break-down in communications due to propagation or communications equipment failure, sounding can be continuous in order to re-establish contact as soon as possible. This feature and operational procedure is particularly useful in establishing initial contact with a terminal.

Another feature of the present evaluation apparatus is that the sounding transmitter 9A, 9B can be operated at reduced power with respect to the communication transmitter 10A, 10B since channel evaluations are relative.

In the channel evaluation apparatus described, the sounding transmissions are made on all channels in parallel with the associated communications transmission. Thus during each sounding sequence the sounding transmissions will be received on the channel currently used for traffic over the regular communications receiving system. This poses a source of interference even though it is only a few seconds out of a 10 minute period. Several methods can be used to minimize or avoid this problem, such as: (a) sounding transmissions can be made at reduced power with respect to the communications transmissions, (b) sounding on the "busy" channel can be omitted, or (c) soundings can be made on a frequency slightly off-set from the traffic channel. In a sounding system tested, wherein sounding transmissions were down in the order of 14 db with respect to those of the communications system and were off-set from the communications channel by 1000 Hertz, satisfactory results were achieved.

I claim

1. Apparatus for evaluating a first set of communication frequency channels for transmission between a first terminal and a second terminal and a second set of communication frequency channels for transmission between the second terminal and the first terminal, wherein said first and second terminals have a communications transmitter and a communications receiver, the apparatus comprising:

first sounding transmitter means located at said first terminal for transmitting first sounding signals over said first set of frequency channels to said second terminal, said first sounding transmitter means includes first encoder means for encoding channel selection information for communication transmissions between said second terminal and said first terminal on said first sounding signals;

second sounding transmitter means located at said second terminal for transmitting second sounding signals over said second set of frequency channels to said first terminal, said second sounding transmitter means includes second encoder means for encoding channel selection information for communication transmissions between said first terminal and said second terminal on said second sounding signals;

first sounding receiver means located at said second terminal for receiving the first sounding signals transmitted over said first set of frequency channels and for determining the quality of transmission over each of the frequency channels in said first set; and second sounding receiver means located at said first terminal for receiving the second sounding signals transmitted over said second set of frequency channels and for determining the quality of transmission over each of the frequency channels in said second set.

2. Apparatus as claimed in claim 1 wherein said first sounding receiver means includes first display means for indicating channel quality at said second terminal, and said second sounding receiver means includes second display means for indicating channel quality at said first terminal.

3. Apparatus as claimed in claim 2 wherein said first sounding receiver means includes first decoder means for decoding the first sounding signals and for providing the channel selection information to the first display means, and wherein the second sounding receiver means includes second decoder means for decoding the second sounding signals and for providing the channel selection information to the second display means.

4. Apparatus as claimed in claim 3 which further includes first control means at said first terminal synchronized with second control means at said second terminal, said first control means coupled to said first sounding transmitter for controlling a first time-step sequence through the first set of frequency channels for said first sounding transmitter and further coupled to said second sounding receiver means for controlling a second time-step sequence through the second set of frequency channels for said second sound receiver, said second control means coupled to said second sounding transmitter means for controlling a time-step sequence identical to the second time-step sequence through the second set of frequency channels for said second sounding transmitter and further coupled to said first sounding receiver means for controlling a time-step sequence identical to the first-step sequence through the first set of frequency channels for said first sounding receiver means.

5. Apparatus as claimed in claim 4 wherein the sounding signals consist of a series of repeated characters, a fixed number being transmitted over each channel.

* * * * *